United States Patent [19]

Bayer et al.

[11] Patent Number: 4,523,457

[45] Date of Patent: Jun. 18, 1985

[54] ROTATIONAL SPEED MEASURING DEVICE WITH ECONOMY FIELD

[75] Inventors: Ulrich Bayer, Stuttgart; Siegfried Ochs, Esslingen, both of Fed. Rep. of Germany

[73] Assignee: Daimler-Benz Aktiengesellschaft, Fed. Rep. of Germany

[21] Appl. No.: 519,740

[22] Filed: Aug. 2, 1983

[30] Foreign Application Priority Data

Aug. 4, 1982 [DE] Fed. Rep. of Germany ....... 3229065

[51] Int. Cl.³ .......................................... G01M 15/00
[52] U.S. Cl. ..................................................... 73/114
[58] Field of Search ...................... 73/113, 114, 119 A

[56] References Cited

U.S. PATENT DOCUMENTS

| 4,210,908 | 7/1980 | Sakakibara ...................... 73/114 X |
| 4,244,210 | 1/1981 | Prohaska et al. ...................... 73/113 |
| 4,444,047 | 4/1984 | Kern ...................... 73/114 |

FOREIGN PATENT DOCUMENTS 124917 7/1983 Japan ...................... 73/114

Primary Examiner—Jerry W. Myracle
Attorney, Agent, or Firm—Craig and Burns

[57] ABSTRACT

An installation for the indication of the fuel consumption, especially of heavy truck engines, with a sensor for the position of the drive pedal and with a set of fuel consumption-engine rotational speed-characteristic curves stored in a storage device and dependent on the drive pedal position; a predetermined number of at least single-color light diodes, of which each is coordinated to a predetermined partial range of engine rotational speed and indicates an information about the specific fuel consumption as a function of the instantaneous control rack, respectively, throttle valve position coordinated to the drive pedal position within the engine rotational speed partial range corresponding to the stored set of fuel consumption-engine rotational speed curves, are integrated into the dial of a tachometer corresponding to their coordination to the predetermined engine rotational speed partial ranges.

2 Claims, 3 Drawing Figures

4,523,457

ROTATIONAL SPEED MEASURING DEVICE WITH ECONOMY FIELD

FIELD OF THE INVENTION

The present invention relates to an arrangement for the indication of the fuel consumption, especially of heavy truck engines, with a sensor or pick-up for the position of the drive pedal and with a fuel consumption-engine rotational speed performance graph dependent on the drive pedal position stored in a storage device.

BACKGROUND OF THE INVENTION

An arrangement generally of this type is described in the German Offenlegungsschrift 29 26 268. This known arrangement serves for the determination of the instantaneous fuel consumption of internal combustion engines with fuel injection and ascertains the instantaneous fuel consumption from signals proportional to the rotational speed and the travelled distance and from a signal corresponding to the drive pedal position as well as from predetermined fuel consumption-engine rotational speed characteristic curves dependent on the drive pedal position and indicates this value of the instantaneous fuel consumption.

An installation is disclosed in the U.S. Pat. No. 4,244,210 in which a tachometer dial includes a predetermined number of light elements, of which each is coordinated to a predetermined dial partial range and by means of which the instantaneous fuel consumption is also indicated. Though the instantaneous fuel consumption provides an absolute value, no conclusions can be drawn therefrom as regards an economic driving manner since this value changes, for example, during the shifting into another speed. The specific fuel consumption provides in that case more unequivocal indications.

Many motor vehicles are series-equipped with tachometers, on the dial surface of which is printed a so-called economy field. This field which is characterized in color, is to provide an indication for fuel-favorable operating, respectively, rotational speed ranges of the engine. A similar arrangement operates by means of several light diodes of different color which light up if the rotational speed is located in the rotational speed ranges coordinated to these light diodes (Publication, "Elektor", November, 1980, page 45 et seq.). These indications refer to the engine rotational speed alone, and can be very inaccurate since the load condition of the engine (position of the control rack or of the throttle valve, or duration of the injection period) is not taken into consideration.

SUMMARY AND OBJECTS OF THE INVENTION

It is therefore the task of the present invention to improve the device according to the German Offenlegungsschrift 29 26 268 to the effect that an unequivocal and easily readable indication is produced which indicates to the driver whether a relatively low or high fuel consumption can be expected from his instantaneous manner of driving and how he must change the driving manner in order to attain a low fuel consumption.

The underlying problems are solved according to the present invention in that a certain number of at least single-color light elements, of which each is coordinated to a certain partial range of the engine rotational speed for indicating information about the specific fuel consumption as a function of the instantaneous control rack or throttle valve position coordinated to the drive pedal position within this engine rotational speed partial range corresponding to the stored fuel consumption-engine rotational speed performance graph, are integrated into the dial of a tachometer corresponding to their coordination to the predetermined engine rotational speed partial ranges.

These and other objects, features and advantages of the present invention will become more apparent from the following description when taken in connection with the accompanying drawing which shows, for purposes of illustration only, one embodiment in accordance with the present invention, and wherein:

DETAILED DESCRIPTION OF THE PREFERRED EMBODIMENT

Figure 1:
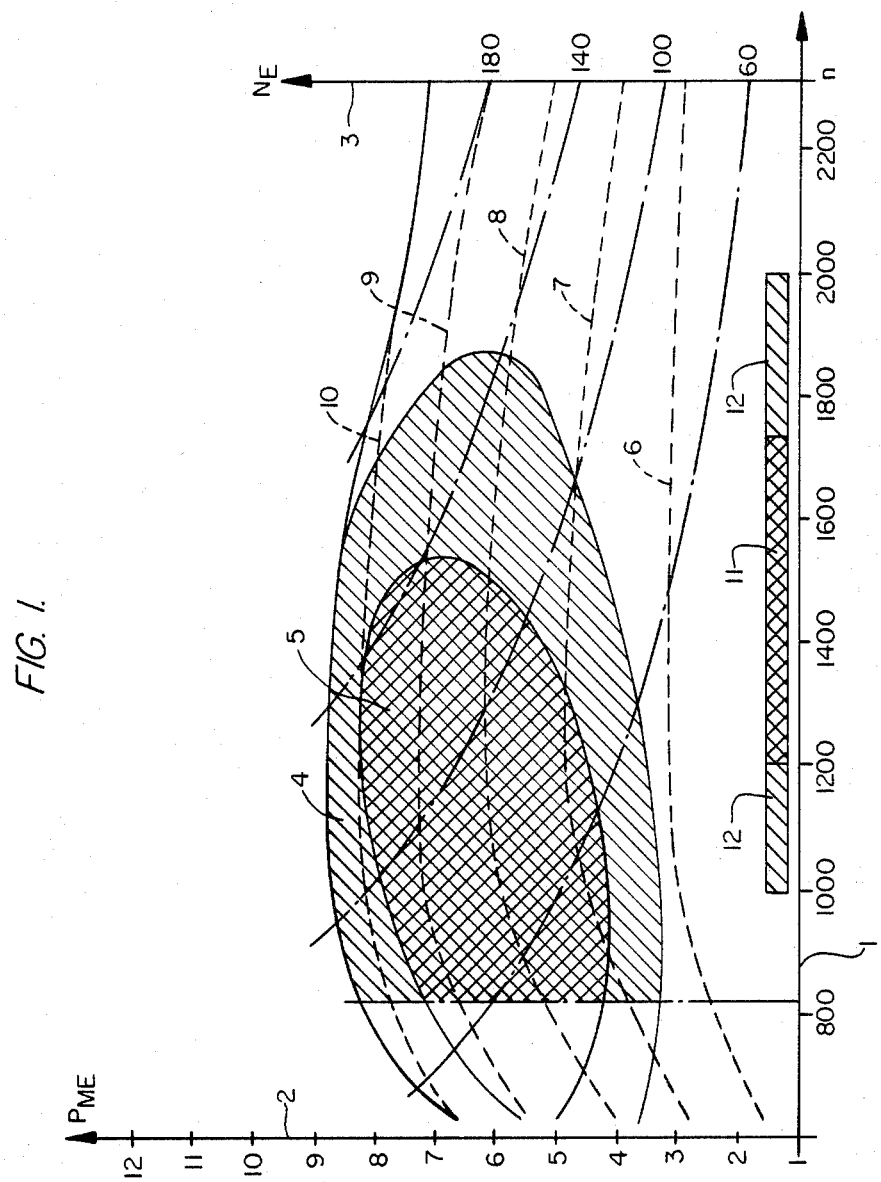
FIG. 1 is a diagram of engine curves.

Referring now to the drawing wherein like reference numerals are used throughout the various views to designate like parts, FIG. 1 illustrates a typical set of characteristic engine curves of an engine intended for a truck. The engine rotational speed is plotted along the abscissa 1 while the average effective pressure $P_{ME}$ is indicated along the ordinate 2 (left), and the effective output ($N_E$) is indicated along the ordinate 3 (right). In addition to the output curves in dash and dotted lines, dash lines 6 to 10 are shown in the diagram which correspond to certain control rack positions. Two areas bounded by solid lines and cross-hatched are also indicated in the diagram. The larger cross-hatched area 4 indicates that at each operating point within this area, the fuel consumption is no higher than, for example 215 g/kWh which corresponds to a low fuel consumption. The smaller criss-crossed area 5 indicates analogously that at each operating point within this area the fuel consumption is no higher than, for example, 205 g/kWh which indicates a very low to optimum consumption. Appropriately, this diagram is only for rotational speeds above the idling rotational speed, in this case, approximately 820 rpm.

If, on prior tachometer dials a very low fuel consumption was indicated, for example, at rotational speeds of 1200 to 1750 rpm (reference numeral 11) and a small fuel consumption was indicated, for example, at rotational speeds from 1000 to 1200 rpm, respectively, from 1750 to 2000 rpm (reference numeral 12), then it can be readily seen that these indications, if at all, can be valid only for one control rack position. However, in this example, they do not correspond at all with the actual conditions. Instead, for example, at a control rack position 7 from the idling rotational speed to about 1300 rpm, a very low fuel consumption would have to be indicated and from 1300 to about 1600 rpm a low fuel consumption.

Figure 2:
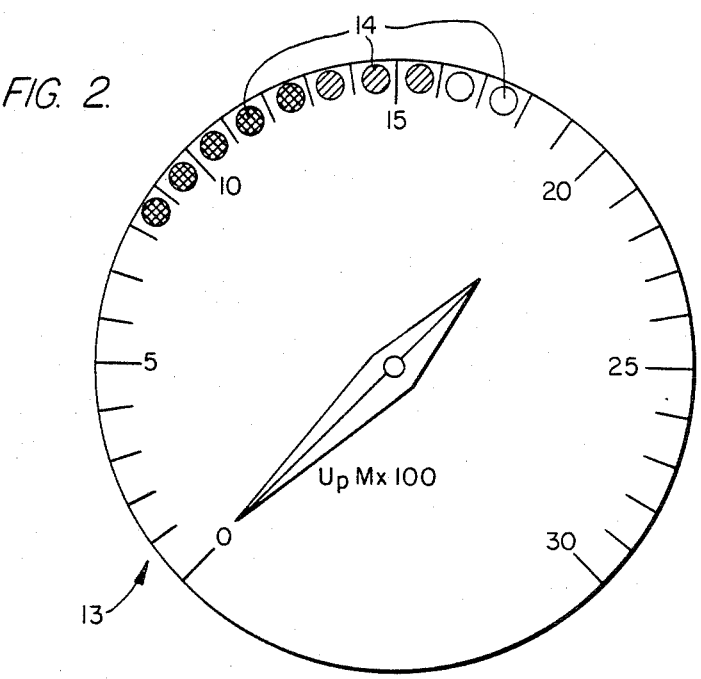
FIG. 2 is a plan view on the dial of a tachometer in accordance with the present invention.

Attention is now directed to FIG. 2 wherein ten two-color light diodes 14 are so integrated into the dial of the tachometer, illustrated in the embodiment of FIG. 2 as having pointer instrument and generally designated by reference numeral 13, that they lie between the dial lines and encompass altogether the range of 800 to 1800 rpm so that each light diode represents a rotational speed partial range of 100 rpm. The tachometer dial itself extends up to 3000 rpm. However, light diodes can be dispensed with above 1800 rpm since one must reckon only with high fuel consumption in this range, as can be seen from the diagram in FIG. 1. If the control rack is in the position 7, then the light diodes between 800 and 1300 rpm light up in their first color, indicated in the drawing by criss-cross hatching which may mean, for example, green; the light diodes between 1300 and 1600 rpm then light up in the second color, indicated in this case by cross-hatching which means, for example, yellow. The two light diodes between 1600 and 1800 rpm do not light up, which is to indicate a high fuel consumption. The driver can thus see immediately which rotational speed range corresponds at the instantaneous control rack poition to an economic consumption.

The driver will endeavor to the greatest possible extent to bring the indicator pointer of the tachometer into the green range if he desires to drive economically.

A change of the gas pedal position and therewith of the control rack position, for example, to the position 9, also changes the light diode indication corresponding to the engine diagram in FIG. 1 so that the light diodes between 800 and 1500 rpm light up green and those between 1500 and 1800 rpm light up yellow.

Figure 3:
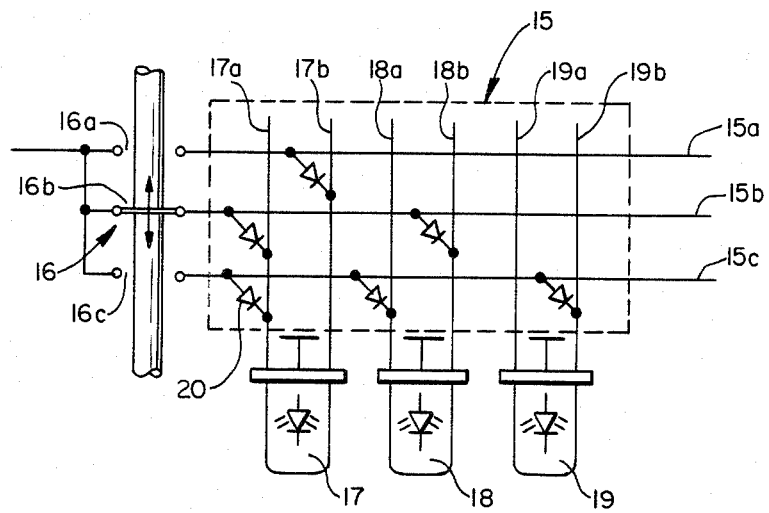
FIG. 3 is a schematic circuit diagram for use in the present invention.

FIG. 3 illustrates schematically a circuit according to the present invention, which, for the sake of simplicity, is limited to three control rack positions and three light diodes. The partial range of the engine diagram which is of interest is "digitalized" in a diode storage matrix generally designated by reference numeral 15. The control rack positions are "digitalized" by means of a stepping switch 16 which is actuated by the control rack. The stepping switch 16 includes switching contacts 16a, 16b and 16c. The diode matrix 15 may be a conventional cross bar distributor whose points of intersection are bridged by diodes. The horizontal bars 15a, 15b and 15c are coordinated to the switching contacts of the stepping switch which, in the closed condition, connect the respective horizontal bar with the positive terminal of a voltage supply.

The vertical bars 17a and 17b are connected with the terminals of the two-color light diode 17 whereby a current by way of the bar 17a causes the diode to light up green and a current by way of the bar 17b causes the diode to light up yellow. Analogously the bars 18a and 18b are connected with the light diode 18 and the bars 19a and 19b with the light diode 19.

If for example, the light diode 17 is now to light up green in the position 16c, i.e., with a closed contact 16c, then a diode 20 must be connected in the forward direction from the bar 15c to the bar 17a. If it should light up yellow, the diode must lead from the bar 15c to the bar 17b. The diode matrix 15 is so interconnected in FIG. 3 that with a closed contact 16a the light diodes 17, 18 and 19 in this sequence light up yellow, do not light up and do not light up respectively, i.e., are yellow, dark and dark, respectively. With a closed contact 16b, they will then operate to light up green, yellow and no light up, respectively, and with a closed contact 16c, will finally operate to light up green, green and yellow, respectively.

The illustrated embodiment with stepping switch and diode matrix as storage device serves merely as simple illustration. In an actual construction, the present invention prefers in lieu of the stepping switch an optical or electronic "digitalization" and a semi-conductor storage device of conventional construction since such a solution is more cost-effective, can be constructed more rapidly, and is more reliable in operation with a larger number of storage places. Of course, such a variable "economic field" can also be build into tachometer dials and a corresponding velocity-rotational speed-converter circuit is used. This is to be considered as identical in the present invention.

The advantage of the solution according to the present invention resides in that the driver can recognize at once with a single glance which is the most fuel economic, respectively, most fuel uneconomic rotational speed at the instantaneous gas pedal position, respectively, control rack position, how high the instantaneous rotational speed is and in which direction the most fuel favorable rotational speed range will be displaced in case of load changes.

While we have shown and described only one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. An installation for indicating fuel consumption, comprising sensor means for the position of a drive pedal and storage means in which are stored a set of characteristic fuel consumption-engine rotational speed curves dependent on drive pedal position, said installation including a tachometer means having a predetermined number of at least single-color light means, each of which is coordinated to a predetermined engine rotational speed-partial range for indicating information about the specific fuel consumption as a function of the drive pedal position within this engine rotational speed-partial range corresponding to the stored characteristic curves, said light means being integrated into a dial of the tachometer means in a manner corresponding with the coordination thereof to the predetermined engine rotational speed-partial ranges.

2. An installation according to claim 1, wherein each light means is a two-color light diode, whereby the light diode, lighting up in the first color, indicates a very low specific fuel consumption, lighting up in the second color indicates a low specific fuel consumption and when not lighting up, indicates a high specific fuel consumption.

* * * * *